United States Patent
Jo et al.

(10) Patent No.: US 10,886,068 B2
(45) Date of Patent: *Jan. 5, 2021

(54) CERAMIC ELECTRONIC COMPONENT

(71) Applicant: SAMSUNG ELECTRO-MECHANICS CO., LTD., Suwon-si (KR)

(72) Inventors: Eui Hyun Jo, Suwon-si (KR); Hyun Hee Gu, Suwon-si (KR); Jang Yeol Lee, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,174

(22) Filed: Dec. 2, 2019

(65) Prior Publication Data

US 2020/0105478 A1 Apr. 2, 2020

Related U.S. Application Data

(63) Continuation of application No. 16/279,079, filed on Feb. 19, 2019, now Pat. No. 10,529,492, which is a
(Continued)

(30) Foreign Application Priority Data

Sep. 6, 2018 (KR) .................. 10-2018-0106556

(51) Int. Cl.
*H01G 4/30* (2006.01)
*H01G 4/224* (2006.01)
(Continued)

(52) U.S. Cl.
CPC ............. *H01G 4/30* (2013.01); *H01G 4/1227* (2013.01); *H01G 4/224* (2013.01); *H01G 4/232* (2013.01)

(58) Field of Classification Search
CPC ............ H01G 4/30; H01G 4/12; H01G 4/224; H01G 4/232
See application file for complete search history.

(56) References Cited

U.S. PATENT DOCUMENTS 5,712,758 A 1/1998 Amano et al.
10,529,492 B1 * 1/2020 Jo ...................... H01G 4/2325
(Continued)

FOREIGN PATENT DOCUMENTS

| JP | 04061106 A * | 2/1992 |
| JP | 3232914 B2 | 11/2001 |
| KR | 10-1721628 B1 | 3/2017 |

OTHER PUBLICATIONS

Notice of Allowance issued in corresponding U.S. Appl. No. 16/279,079 dated Sep. 3, 2019.
(Continued)

*Primary Examiner* — Eric W Thomas
(74) *Attorney, Agent, or Firm* — Morgan, Lewis & Bockius LLP (57) ABSTRACT

A ceramic electronic component includes a body including a dielectric layer and first and second internal electrodes disposed to oppose each other with the dielectric layer interposed therebetween, first and second external electrodes each including a connection portion disposed on a side surface of the body and a band portion extending from the connection portion to portions of upper/lower and front/rear surfaces of the body, first and second resin layers each disposed between the band portion and the body and extending from an end of the band portion towards each side surface by a predetermined length, in which the predetermined length is within a range of 3 μm to 200 μm.

16 Claims, 6 Drawing Sheets

Related U.S. Application Data continuation of application No. 16/177,960, filed on Nov. 1, 2018, now Pat. No. 10,535,469.

(51) Int. Cl.
*H01G 4/232* (2006.01)
*H01G 4/12* (2006.01)

(56) References Cited

U.S. PATENT DOCUMENTS

| | | |
|---|---|---|
| 10,535,469 B1* | 1/2020 | Jo .................. H01G 4/30 |
| 2011/0193448 A1 | 8/2011 | Saruban et al. |
| 2013/0250480 A1 | 9/2013 | Ahn et al. |
| 2016/0027561 A1 | 1/2016 | Inoue et al. |
| 2016/0027569 A1 | 1/2016 | Inoue et al. |
| 2016/0027585 A1 | 1/2016 | Inoue et al. |
| 2016/0293331 A1* | 10/2016 | Kitamura .......... H01G 4/12 |
| 2017/0018363 A1* | 1/2017 | Tanaka ............ H01G 4/232 |

OTHER PUBLICATIONS

Final Office Action issued in corresponding U.S. Appl. No. 16/279,079 dated Jul. 12, 2019.

Non-Final Office Action issued in corresponding U.S. Appl. No. 16/279,079 dated Apr. 16, 2019.

* cited by examiner

CERAMIC ELECTRONIC COMPONENT

CROSS-REFERENCE TO RELATED APPLICATION(S)

This application is a continuation of U.S. patent application Ser. No. 16/279,079, filed on Feb. 19, 2019, which is a continuation of U.S. patent application Ser. No. 16/177,960, filed on Nov. 1, 2018, which claims the benefit of priority to Korean Patent Application No. 10-2018-0106556 filed on Sep. 6, 2018 in the Korean Intellectual Property Office, the disclosures of which are incorporated herein by reference in their entirety.

TECHNICAL FIELD

The present disclosure relates to a ceramic electronic component.

BACKGROUND

A multilayer ceramic capacitor (MLCC) is a chip-type condenser mounted on the printed circuit substrates of a variety of electronic products such as an image display device, including liquid crystal displays (LCD) and plasma display panels (PDP), computers, smartphones, cellular phones, and the like, serving to charge and discharge electricity.

A multilayer ceramic capacitor may be used as a component of various electronic devices as it is relatively small in size and is able to secure high capacity while being easily installed. As electronic devices such as computers, mobile devices, and the like, are miniaturized and increased in power, there has been increased demand for miniaturized and high capacity multilayer ceramic capacitors.

To simultaneously achieve miniaturization and high capacity, the number of layers may need to be increased by configuring thicknesses of a dielectric layer and an internal electrode to be thin. Also, to secure maximum valid capacity, thicknesses of a margin portion, a cover portion, and an external electrode may need to be reduced, and the reduction in thicknesses may lead to a degradation of moisture resistance reliability.

SUMMARY

An aspect of the present disclosure is to provide a ceramic electronic component having excellent moisture resistance reliability.

According to an aspect of the present disclosure, a ceramic electronic component includes a body including a dielectric layer and first and second internal electrodes disposed to oppose each other with the dielectric layer interposed therebetween, first and second surfaces opposing each other, third and fourth surfaces connected to the first and second surfaces and opposing each other, and fifth and sixth surfaces connected to the first to fourth surfaces and opposing each other, a first external electrode including a first connection portion disposed on the third surface of the body, and a first band portion extending from the first connection portion to portions of the first, second, fifth, and sixth surfaces, a second external electrode including a second connection portion disposed on the fourth surface of the body, and a second band portion extending from the second connection portion to portions of the first, second, fifth, and sixth surfaces, a first resin layer disposed between the first band portion and the body and extending from an end of the first band portion towards the third surface by a first predetermined length, and a second resin layer disposed between the second band portion and the body and extending from an end of the second band portion towards the fourth surface by a second predetermined length. The first and second predetermined lengths are within a range of 3 µm to 200 µm.

According to another aspect of the present disclosure, a ceramic electronic component includes a body including a dielectric layer and first and second internal electrodes disposed to oppose each other with the dielectric layer interposed therebetween, first and second surfaces opposing each other, third and fourth surfaces connected to the first and second surfaces and opposing each other, and fifth and sixth surfaces connected to the first to fourth surfaces and opposing each other, first and second external electrodes each including a connection portion disposed on the third or fourth surface of the body, and a band portion extending from the connection portion to portions of the first, second, fifth, and sixth surfaces of the body, first and second resin layers each disposed between the band portion and the body, and extending from an end of the band portion towards the third or fourth surface by a predetermined length. The predetermined length of each of the first and second resin layers is smaller than a length of the band portion of the first and second external electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

In the drawings, irrelevant descriptions will be omitted to clearly describe the present disclosure, and to clearly express a plurality of layers and areas, thicknesses may be magnified. Elements having the same function within the scope of the same concept will be described with use of the same reference numeral. Further, throughout the specification, it will be understood that when a part "includes" an element, it may further include another element, not excluding another element, unless otherwise indicated.

In the drawings, an X direction is a second direction, an L direction, or a length direction, a Y direction is a third direction, a W direction, or a width direction, a Z direction is a first direction, a layering direction, a T direction, or a thickness direction.

Ceramic Electronic Component

Figure 1:
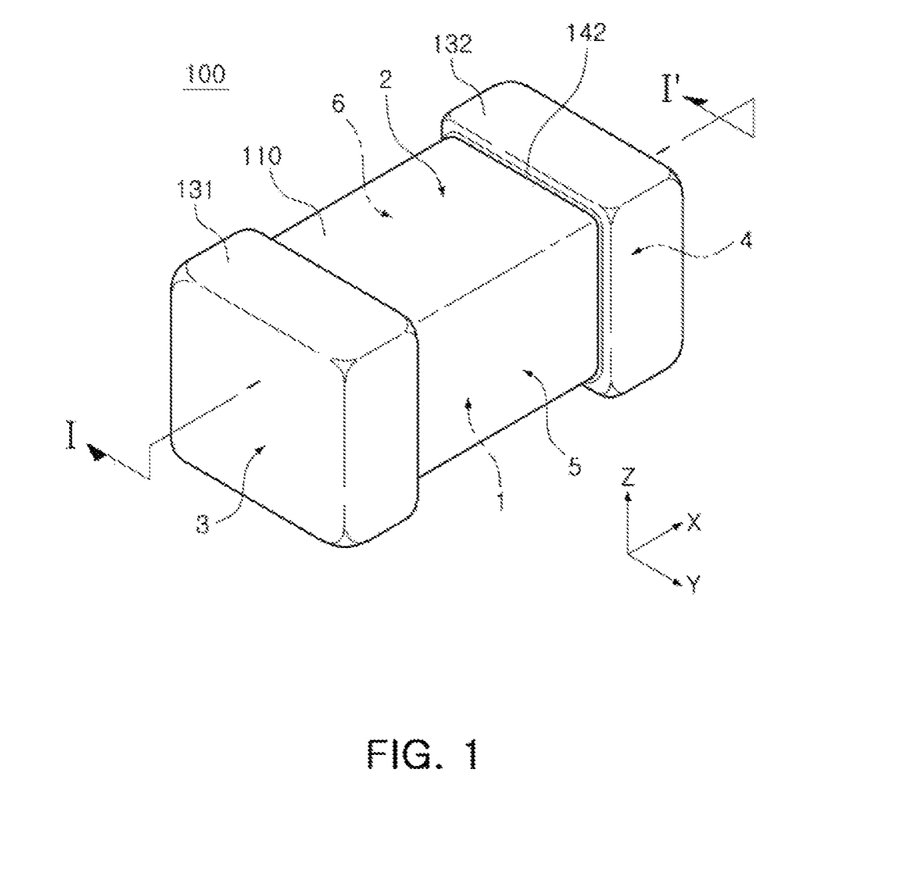
FIGS. 1 and 2 are perspective diagrams illustrating a ceramic electronic component according to an exemplary embodiment in the present disclosure.
Figure 2:
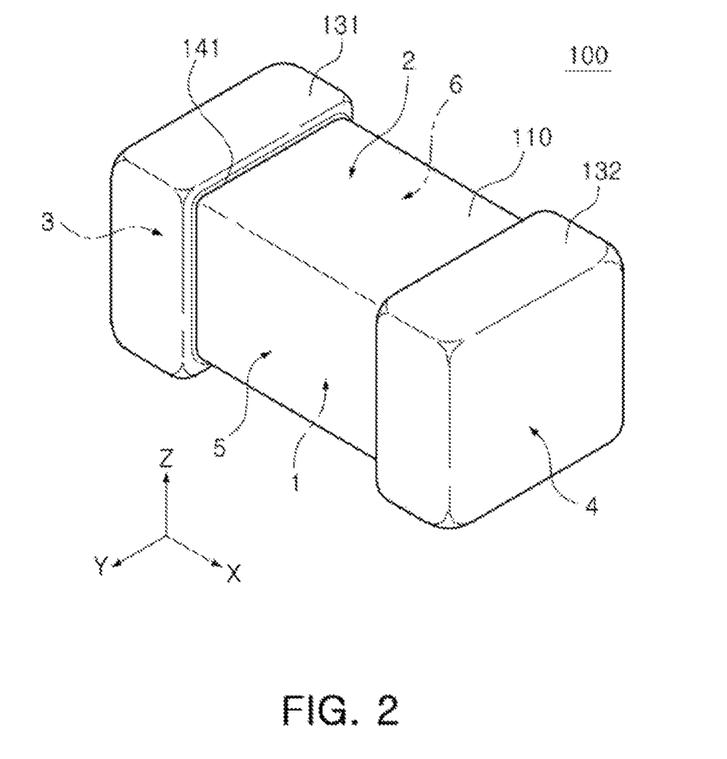

FIGS. 1 and 2 are perspective diagrams illustrating a ceramic electronic component according to an exemplary embodiment.

Figure 3:
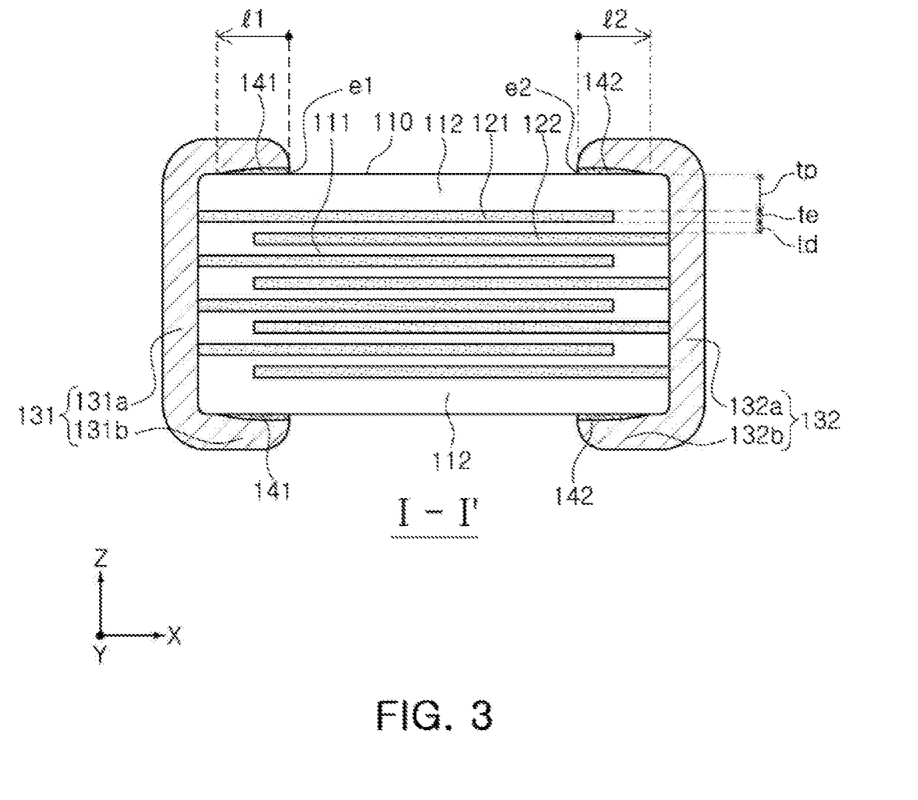
FIG. 3 is a cross-sectional diagram taken along line I-I' in FIG. 1.

FIG. 3 is a cross-sectional diagram taken along line I-I' in FIG. 1.

Figure 4A:
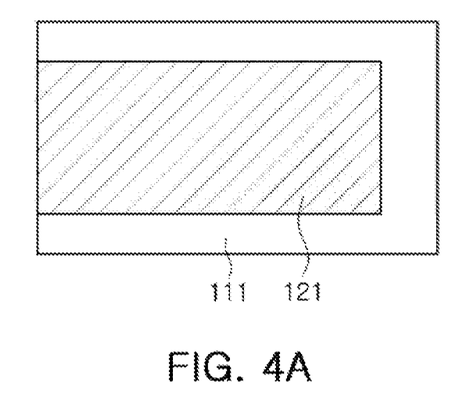
FIG. 4A is a diagram illustrating a ceramic green sheet on which a first internal electrode is printed.
Figure 4B:
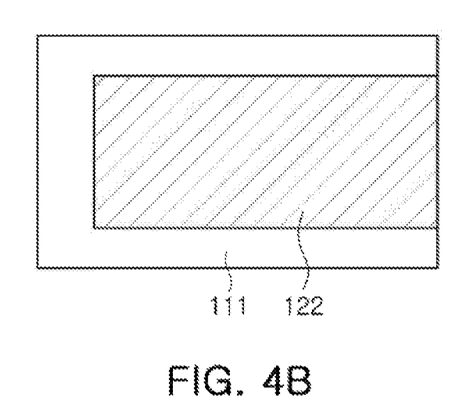
FIG. 4B is a diagram illustrating a ceramic green sheet on which a second internal electrode is printed.

FIG. 4A is a diagram illustrating a ceramic green sheet on which a first internal electrode is printed, and FIG. 4B is a diagram illustrating a ceramic green sheet on which a second internal electrode is printed.

Referring to FIGS. 1 to 4, a ceramic electronic component 100 according to an example may include a body 110 configured to include a dielectric layer 111 and first and second internal electrodes 121 and 122 disposed to oppose each other with the dielectric layer interposed therebetween, first and second surfaces 1 and 2 opposing each other, third and fourth surfaces 3 and 4 connected to the first and second surfaces 1 and 2 and opposing each other, and fifth and sixth surfaces 5 and 6 connected to the first to fourth surfaces 1 to 4 and opposing each other, a first external electrode 131 configured to include a first connection portion 131a disposed on the third surface 3 of the body 110, and a first band portion 131b extending from the first connection portion 131a to portions of the first, second, fifth, and sixth surfaces, a second external electrode 132 configured to include a second connection portion 132a disposed on the fourth surface 4 of the body 110 and a second band portion 132b extending from the second connection portion 131b to portions of the first, second, fifth, and sixth surfaces, a first resin layer 141 configured to be disposed between the first band portion 131b and the body 110 and extending from an end e1 of the first band portion 131b towards the third surface 3 by l1, and a second resin layer 142 configured to be disposed between the second band portion 132b and the body 110 and extending from an end e2 of the second band portion 132b towards the fourth surface 4 by l2. Preferably, l1 and l2 may be smaller than the length of the first or second band portion 131b or 132b in the extending direction thereof. More preferably, l1 and l2 may be within a range of 3 μm to 200 μm.

The dielectric layer 11 and the internal electrodes 121 and 122 may be alternately layered in the body 110.

There may be no particular limitation on a shape of the body 110, but as illustrated in the diagram, the body 110 may have a hexagonal shape or a shape similar to a hexagon. Due to shrinkage of a ceramic powder included in the body 110 during a process of sintering, the body 110 may not be an exact hexagon, but may have a substantially hexagonal shape.

The body 110 may have the first and second surfaces 1 and 2 opposing each other in a thickness direction (a Z direction), the third and fourth surfaces 3 and 4 connected to the first and second surfaces 1 and 2 and opposing each other in a length direction (an X direction), and the fifth and sixth surfaces 5 and 6 connected to the first and second surfaces 1 and 2 and the third and fourth surfaces 3 and 4, and opposing each other in a width direction (a Y direction).

The plurality of dielectric layers 111 forming the body 110 may be in a sintered state, and the dielectric layers 111 may be integrated, such that boundaries between adjacent dielectric layers 111 may be difficult to identify without using a scanning electron microscope (SEM).

A material forming the dielectric layer 111 may not be particularly limited as long as sufficient capacitance is able to be obtained. For example, the material of the dielectric layer 111 may be a barium titanate ($BaTiO_3$) power. As the material composing the dielectric layer 111, various ceramic additives, organic solvents, coupling agents, dispersing agents, and the like, may be added in addition to barium titanate ($BaTiO_3$) powder, or the like, depending on an intended purpose.

A thickness of the dielectric layer 111 may not be particularly limited.

However, if the dielectric layer 111 is configured to have a thickness lower than 0.6 μm, particularly, if a thickness of the dielectric layer 111 is configured to be 0.4 μm or less, moisture resistance reliability may degrade.

As described in the description below, in the case in which l1 and l2 are configured to be within a range of 3 μm to 200 μm, moisture resistance reliability of the ceramic electronic component may improve, and thus, even when a thickness of the dielectric layer 111 is 0.4 μm or less, sufficient moisture resistance reliability may be secured.

Accordingly, even in the case in which a thickness of the dielectric layer is 0.4 μm or less, a moisture resistance reliability effect may become more prominent according to the example.

A thickness of the dielectric layer 111 may refer to an average thickness of the dielectric layers 111 interposed between the first and second internal electrodes 121 and 122.

The average thickness of the dielectric layers 111 may be obtained by scanning a cross-section of the body 110 taken in a length and thickness direction (an L-T direction) using an SEM.

For example, a random image of the dielectric layer may be extracted from a scanned image of a cross-section taken in a length and thickness direction (an L-T direction), created by cutting a central portion of the body 110 in a width direction, using an SEM, and an average of thicknesses of 30 points at equal intervals, measured in a length direction, may be calculated.

The 30 points with equal intervals may be measured in a capacitance forming portion which refers to an area of overlap between the first and second internal electrodes 121 and 122.

In this case, the ceramic electronic component 100 according to the example may include the capacitance forming portion configured to form capacitance including the first and second internal electrodes disposed in the body 110 and opposing each other with the dielectric layer interposed therebetween, and a cover portion 112 configured to be formed in upper and lower portions of the capacitance forming portion.

The cover portion 112 may not include an internal electrode, and may include the same material as the material of the dielectric layer 111. In other words, the cover portion 112 may include a ceramic material, such as a barium titanate ($BaTiO_3$) ceramic material, for example.

The cover portion 112 may be formed by layering a single dielectric layer or two or more dielectric layers on upper and lower surfaces of the capacitance forming portion in upper and lower directions, respectively, and may serve to prevent damage to an internal electrode caused by physical or chemical stress.

A thickness of the cover portion 112 may not be particularly limited. However, to achieve miniaturization and high capacitance of the ceramic electronic component, a thickness tp of the cover portion 112 may be 20 μm or less, but in this case, as a moisture penetration route is reduced, moisture resistance reliability may degrade.

As described in the description below, in the case in which l1 and l2 are configured to be within a range of 3 μm to 200 μm, moisture resistance reliability of the ceramic electronic component 100 may improve. Thus, even when a thickness tp of the cover portion 112 is 20 μm or less, sufficient moisture resistance reliability may be secured.

Accordingly, even in the case in which a thickness tp of the cover portion 112 is 20 μm or less, a moisture resistance reliability effect may become more prominent according to the example.

The internal electrodes 121 and 122 may be alternately layered with the dielectric layer 111, and may include the first and second internal electrodes 121 and 122. The first and second internal electrodes 121 and 122 may be alternately disposed to oppose each other with the dielectric layer 111 interposed therebetween, and may be exposed to the third and fourth surfaces 3 and 4 of the body 110, respectively.

Referring to FIG. 3, the first internal electrode 121 may be spaced apart from the fourth surface 4, and may be exposed through the third surface 3. The second internal electrode 122 may be spaced apart from the third surface 3, and may be exposed through the fourth surface 4.

In this case, the first and second internal electrodes 121 and 122 may be electrically separated from each other by the dielectric layer 111 disposed therebetween. Referring to FIG. 4, the body 110 may be formed by alternately layering a ceramic green sheet a on which the first internal electrode 121 is printed and a ceramic green sheet b on which the second internal electrode 122 is printed, and being sintered.

A material forming the first and second internal electrodes 121 and 122 may not be particularly limited, and may be formed of conductive paste comprised of more than one material among noble metals such as palladium (Pd), a palladium-silver (Pd—Ag) alloy, and the like, and nickel (Ni) and copper (Cu), for example.

As the method of printing a conductive paste, a screen printing method, a gravure printing method, or the like, may be used, but the method of printing is not limited thereto.

Thicknesses of the first and second internal electrodes 121 and 122 may not be particularly limited. However, to achieve miniaturization and high capacitance of the ceramic electronic component, the thicknesses to of the first and second internal electrodes 121 and 122 may be 0.4 μm or less.

The thicknesses of the first and second internal electrodes 121 and 122 may refer to an average thickness of the first and second internal electrodes 121 and 122.

An average thickness of the first and second internal electrodes 121 and 122 may be obtained by scanning a cross-section of the body 110 taken in a length and thickness direction (an L-T direction) using an SEM.

For example, a random image of the first and second internal electrodes 121 and 122 may be extracted from a scanned image of a cross-section taken in a length and thickness direction (an L-T direction), created by cutting a central portion of the body 110 in a width direction, using an SEM, and an average of thicknesses of 30 points at equal intervals, measured in a length direction, may be calculated.

The 30 points at equal intervals may be measured in a capacitance forming portion which refer to an area of overlap between the first and second internal electrodes 121 and 122.

The external electrodes 131 and 132 may be disposed in the body 110, and may include the first and second external electrodes 131 and 132 connected to the first and second internal electrodes 121 and 122, respectively.

The first external electrode 131 may include a first connection portion 131a disposed on the third surface 3 of the body, and a first band portion 131b extending from the first connection portion to portions of the first, second, fifth, and sixth surfaces.

The second external electrode 132 may include a second connection portion 132a disposed on the fourth surface 4 of the body, and a second band portion 132b extending from the second connection portion to portions of the first, second, fifth, and sixth surfaces.

The first resin layer 141 may be disposed between the first band portion 131b and the body 110 and may be extending from an end e1 of the first band portion 131b towards the third surface 3 by l1.

The second resin layer 142 may be disposed between the second band portion 132b and the body 110 and may be extending from an end e2 of the second band portion 132b towards the fourth surface 4 by l2.

Between the body 110 and the ends e1 and e2 of the band portions 131b and 132b, an air gap may be created, and the air gap may become a main route for moisture penetration and a main cause of degradation in moisture resistance reliability.

In the example, the resin layers 141 and 142 may be disposed between the band portions 131b and 132b and the body 110 to block a moisture penetration route, thereby improving moisture resistance reliability.

Particularly, in the case in which l1, a length of the first resin layer 141 extending from the end e1 of the first band portion 131b towards the third surface 3, and l2, a length of the second resin layer 142 extending from the end e2 of the second band portion 132b towards the fourth surface 4, are configured to be within a range of 3 μm to 200 μm, moisture resistance reliability may be secured while miniaturization and high capacitance of the ceramic electronic component may be achieved.

If l1 and l2 are less than 3 μm, a moisture resistance reliability effect may not be sufficient, and if l1 and l2 are greater than 200 μm, the band portions 131b and 132b may be lengthened, and the thicknesses of the external electrodes 131 and 32 may become high. Thus, it may be difficult to attain miniaturization and high capacitance of the ceramic electronic component.

In this case, the first and second resin layers 141 and 142 may include a silicone resin or a fluorine resin.

Figure 5:
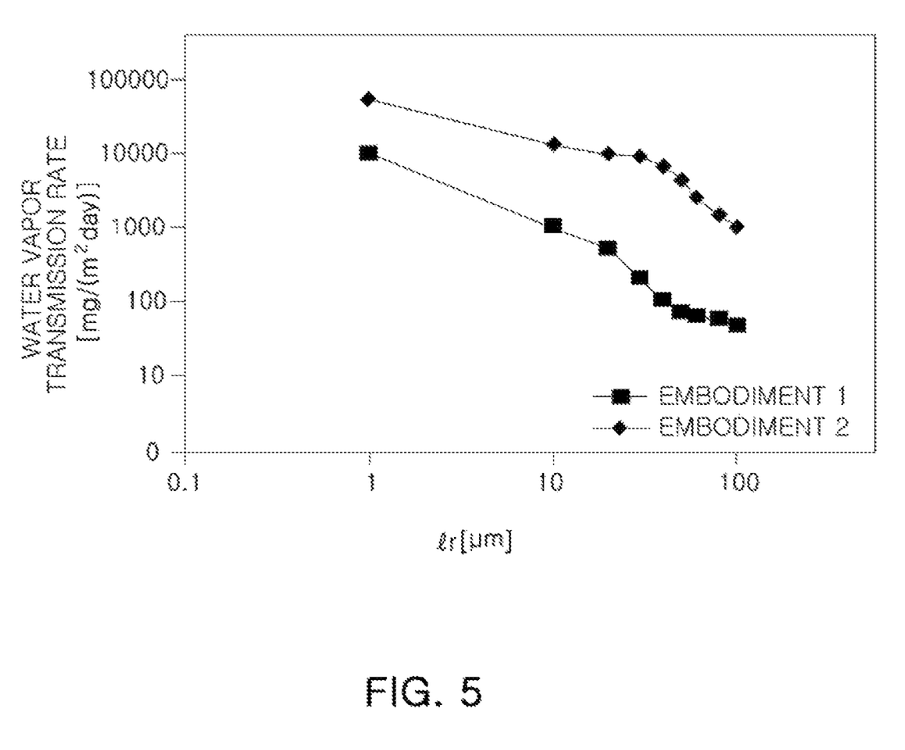
FIG. 5 illustrates graphs showing a water vapor transmission rate depending on lr in first and second exemplary embodiments.

FIG. 5 illustrates graphs showing a water vapor transmission rate depending on lr, a length of a resin layer formed between band portions and a body. A first embodiment illustrates a case in which a resin layer is formed of a silicone resin, and a second embodiment illustrates a case in which a resin layer is formed of a fluorine resin.

Figure 6:
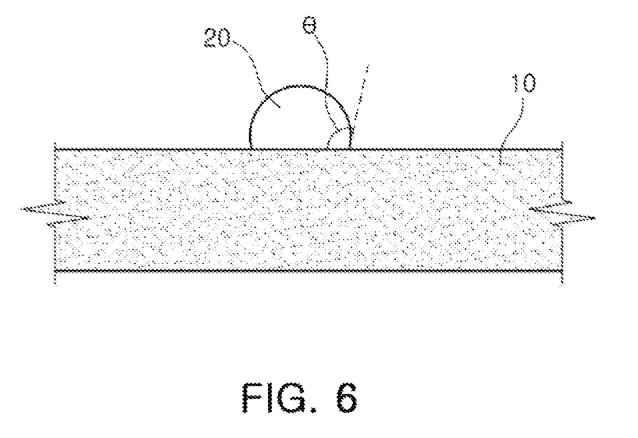
FIG. 6 is a diagram illustrating a water contact angle formed by water contact.

FIG. 6 is a diagram illustrating a contact angle θ formed when water 10 contacts a coating layer 20.

Referring to FIG. 5, in the case of the first embodiment in which a resin layer was formed of a silicone resin, when a length lr of the resin layer was 3 μm or more, a water vapor transmission rate became 5000 mg/(m²*day) or lower, and sufficient moisture resistance reliability was secured. Thus, water vapor transmission rates of first and second resin layers 141 and 142 may be 5000 mg/(m$^2$*day) or lower.

In the case of the second embodiment in which a resin layer was formed of a fluorine resin, a water vapor transmission rate of a fluorine resin was higher than that of a silicone resin. However, referring to FIG. 6, as a fluorine resin has excellent water repellent properties, θ may be 90° or more, and accordingly, moisture was prevented from wetting the body. Thus, moisture resistance reliability was secured by using a fluorine resin although a fluorine resin has a water vapor transmission rate higher than a water vapor transmission rate of a silicone resin.

Also, the first and second resin layers 141 and 142 may be formed through a vacuum impregnation process.

After forming first and second external electrodes 131 and 132 on the body 110, a vacuum impregnation process may be performed using a solution containing a resin, and the first and second resin layers 141 and 142 may be formed in a gap created between a body 110 and ends e1 and e2 of band portions 131b and 132b through the process.

Also, external surfaces of the body 110 and first and second external electrodes 131 and 132 may include a pore, and a resin may be disposed on the pore.

The pore formed on the external surfaces of the body 110 and the first and second external electrodes 131 and 132 may become a moisture penetration route. Thus, a resin may be disposed in the pore to block the moisture penetration route on the external surfaces of the body 110 and the first and second external electrodes 131 and 132, thereby improving moisture resistance reliability.

The above configuration may be achieved by, during the process of forming the first and second resin layers 141 and 142 in the gap created between the body 110 and the band portion 131b and 132b through a vacuum impregnation process, filling the pore on the external surfaces of the body 110 and the first and second external electrodes 131 and 132 with a solution containing a resin. As a silicone resin or a fluorine resin is used as the solution containing a resin, the resin filling the pore on the external surfaces of the body 110 and the first and second external electrodes 131 and 132 may be a silicone resin or a fluorine resin.

Meanwhile, the first and second external electrodes 131 and 132 may be formed of any material having electrical conductivity such as a metal, and a specific material thereof may be determined by considering electrical properties, structural stability, and the like.

For example, the first and second external electrodes 131 and 132 may be a sintered electrode including a conductive metal and glass, or may be a resin electrode including a conductive metal and a base resin.

Also, the first and second external electrodes 131 and 132 may be formed by an atomic layer deposition (ALD) process, a molecular layer deposition (MLD) process, a chemical vapor deposition (CVD) process, a sputtering process, and the like.

However, in the case in which the first and second external electrodes 131 and 132 are sintered electrodes including a conductive metal and glass, a thickness of a corner portion at which connection portions 131a and 132a and band portions 131b and 132b meet may become thin, or an air gap may be created between the body 110 and ends E of the band portions 131b and 132b. Accordingly, moisture resistance reliability may degrade.

Thus, in the case in which the first and second external electrodes 131 and 132 include a conductive metal and glass, the improvement of moisture resistance reliability may become more effective according to the example.

Meanwhile, a plating layer (not illustrated) may be disposed on the first and second external electrodes 131 and 132. The plating layer may serve to improve mounting properties.

The plating layer may be a Ni plated layer or a Sn plated layer. The Ni plated layer or the Sn plated layer may be sequentially formed on the first and second external electrodes 131 and 132, and a plurality of the Ni plated layers, and a plurality of the Sn plated layers may be included.

Also, a size of the ceramic electronic component 100 may not be particularly limited.

However, to simultaneously achieve miniaturization and high capacitance of the ceramic electronic component, the number of layers may need to be increased by configuring thicknesses of a dielectric layer and internal electrodes to be thin. Thus, the improvement of moisture resistance reliability according to the example may be more prominent in the ceramic electronic component having a size of "0402" (0.4 mm×0.2 mm) or less.

Thus, in the case in which a distance between third and fourth surfaces of the body is defined as L, and a distance between fifth and sixth surfaces of the body is defined as W, L may be 0.4 mm or less, and W may be 0.2 mm or less.

In other words, the ceramic electronic component may be implemented as a ceramic electronic component having a size of "0402" (0.4 mm×0.2 mm).

According to the aforementioned examples, a ceramic electronic component having improved moisture resistance reliability may be provided by blocking a moisture penetration route by controlling a length of the resin layer disposed between the body and the band portions of the external electrodes.

While the exemplary embodiments have been shown and described above, it will be apparent to those skilled in the art that modifications and variations could be made without departing from the scope of the present invention as defined by the appended claims.

What is claimed is:

1. A ceramic electronic component, comprising:
a body including a dielectric layer and first and second internal electrodes disposed to oppose each other with the dielectric layer interposed therebetween, first and second surfaces opposing each other, third and fourth surfaces opposing each other and connected to the first and second surfaces, and fifth and sixth surfaces opposing each other and connected to the first to fourth surfaces;
a first external electrode including a first connection portion disposed on the third surface of the body, and a first band portion extending from the first connection portion to portions of the first, second, fifth, and sixth surfaces of the body;
a second external electrode including a second connection portion disposed on the fourth surface of the body, and a second band portion extending from the second connection portion to portions of the first, second, fifth, and sixth surfaces of the body;
a first resin layer disposed between the first band portion and the body, and extending from an end of the first band portion towards the third surface; and
a second resin layer disposed between the second band portion and the body and extending from an end of the second band portion towards the fourth surface,
wherein the body and the first and second external electrodes have a pore on external surfaces thereof, and the pore is filled with a resin corresponding the first and second resin layer, wherein a first predetermined length of the first resin layer is within a range of 3 μm to a length of the first band portion of the first external electrode, and wherein a second predetermined length of the second resin layer is within a range of 3 μm to a length of the second band portion of the second external electrode.

2. The ceramic electronic component of claim 1, wherein the first and second resin layers each comprise a silicone resin or a fluorine resin, and wherein the resin filled in the pore comprises a silicone resin or a fluorine resin.

3. The ceramic electronic component of claim 1, wherein the first and second resin layers have a water vapor transmission rate of 5000 mg/(m2*day) or less.

4. The ceramic electronic component of claim 1, wherein the first and second external electrodes comprise a conductive metal and a glass.

5. The ceramic electronic component of claim 1, further comprising:

a plating layer disposed on each of the first and second external electrodes.

6. The ceramic electronic component of claim 5, wherein the plating layer includes at least one Ni plated layer or at least one Sn plated layer, which is sequentially disposed on each of the first and second external electrodes.

7. The ceramic electronic component of claim 1, wherein the first and second internal electrodes each have a thickness of 0.4 μm or less.

8. The ceramic electronic component of claim 7, wherein the dielectric layer has a thickness of 0.4 μm or less.

9. The ceramic electronic component of claim 1, wherein the body comprises a capacitance forming portion including the first and second internal electrodes, and a cover portion disposed on upper and lower surfaces of the capacitance forming portion, and the cover portion has a thickness of 20 μm or less.

10. The ceramic electronic component of claim 1, wherein a distance between the third and fourth surfaces is 0.4 mm or less, and a distance between the fifth and sixth surfaces is 0.2 mm or less.

11. The ceramic electronic component of claim 1, wherein the dielectric layer has a thickness of 0.4 μm or less.

12. A ceramic electronic component, comprising:

a body including a dielectric layer and first and second internal electrodes disposed to oppose each other with the dielectric layer interposed therebetween, first and second surfaces opposing each other, third and fourth surfaces opposing each other and connected to the first and second surfaces, and fifth and sixth surfaces opposing each other and connected to the first to fourth surfaces:

first and second external electrodes each including a connection portion disposed on the third or fourth surface of the body, and a band portion extending from the connection portion to portions of the first, second, fifth, and sixth surfaces of the body;

first and second resin layers each disposed between the band portion and the body, and extending from an end of the band portion towards the third or fourth surface, wherein the body and the first and second external electrodes have a pore on external surfaces thereof, and the pore is filled with a silicone resin or a fluorine resin, wherein a first predetermined length of the first resin layer is within a range of 3 μm to a length of a band portion of the first external electrode, and wherein a second predetermined length of the second resin layer is within a range of 3 μm to a length of a band portion of the second external electrode.

13. The ceramic electronic component of claim 12, wherein the first and second resin layers have a water vapor transmission rate of 5000 mg/(m2*day) or less.

14. The ceramic electronic component of claim 12, wherein the body comprises a capacitance forming portion including the first and second internal electrodes, and a cover portion disposed on upper and lower surfaces of the capacitance forming portion, and the cover portion has a thickness of 20 μm or less.

15. The ceramic electronic component of claim 12, wherein the first and second internal electrodes each have a thickness of 0.4 μm or less.

16. The ceramic electronic component of claim 12, wherein the dielectric layer has a thickness of 0.4 μm or less.

* * * * *